(12) United States Patent
Monux Belloso

(10) Patent No.: US 9,546,080 B2
(45) Date of Patent: Jan. 17, 2017

(54) LIFTER AND METHOD FOR HANDLING A ROTOR BLADE, ROTOR BLADE FOR A WIND GENERATOR AND METHOD FOR MARKING A ROTOR BLADE, SYSTEM COMPRISING A LIFTER AND A ROTOR BLADE

(71) Applicant: AREVA WIND GMBH, Bremerhaven (DE)

(72) Inventor: Oscar Monux Belloso, Bremen (DE)

(73) Assignee: AREVA WIND GMBH (DE)

( * ) Notice: Subject to any disclaimer, the term of this patent is extended or adjusted under 35 U.S.C. 154(b) by 0 days.

(21) Appl. No.: 14/428,902

(22) PCT Filed: Sep. 17, 2013

(86) PCT No.: PCT/EP2013/069198
§ 371 (c)(1),
(2) Date: Mar. 17, 2015

(87) PCT Pub. No.: WO2014/041180
PCT Pub. Date: Mar. 20, 2014

(65) Prior Publication Data
US 2015/0232304 A1    Aug. 20, 2015

(30) Foreign Application Priority Data

Sep. 17, 2012  (EP) .................................. 12184764

(51) Int. Cl.
*B66C 13/46*    (2006.01)
*B66C 1/10*    (2006.01)
(Continued)

(52) U.S. Cl.
CPC ............... *B66C 13/46* (2013.01); *B66C 1/108* (2013.01); *B66C 1/44* (2013.01); *F03D 1/001* (2013.01); *F03D 1/0633* (2013.01)

(58) Field of Classification Search
CPC ............ B66C 1/108; B66C 1/44; B66C 13/46; B25J 9/1697; B25J 13/086; B25J 13/089; B25J 19/021; B25J 19/022; B25J 19/023; B25J 19/025; B25J 19/04; F03D 1/001; F03D 1/0683
(Continued)

(56) References Cited

U.S. PATENT DOCUMENTS 4,139,107 A * 2/1979 Ninomiya et al. ............ 414/392
4,853,771 A * 8/1989 Witriol et al. ................. 348/94
(Continued)

FOREIGN PATENT DOCUMENTS

CN    1906410         1/2007    ............... F03D 1/00
CN    102016297 A     4/2011    ............... F03D 1/06
(Continued)

OTHER PUBLICATIONS

International Search Report issued in application No. PCT/EP2013/069198, dated Feb. 3, 2014 (3 pgs).
(Continued)

*Primary Examiner* — Dean Kramer
(74) *Attorney, Agent, or Firm* — Hayes Soloway P.C.

(57) ABSTRACT

A lifter and a method for handling of a rotor blade of a wind turbine are provided. Furthermore, a rotor blade for a wind generator and a method for marking the rotor blade and a system comprising a rotor blade and a lifter are provided. The lifter comprises at least one grabbing jaw having a pair of arms carrying pads for contacting an outer surface of the rotor blade in predetermined grabbing areas. Furthermore, the lifter comprises a detector for visual inspection of an invisible mark on a surface of the rotor blade. The at least one mark indicates a position of the at least one grabbing area.

12 Claims, 1 Drawing Sheet

(51) Int. Cl.
*B66C 1/44* (2006.01)
*F03D 1/00* (2006.01)
*F03D 1/06* (2006.01)

(58) Field of Classification Search
USPC .............. 294/81.61, 907; 416/223 R; 901/47
See application file for complete search history.

(56) References Cited

U.S. PATENT DOCUMENTS

| | | | |
|---|---|---|---|
| 5,491,549 A * | 2/1996 | Wichner et al. ........... | 356/141.2 |
| 6,081,292 A * | 6/2000 | Lanigan et al. ............... | 348/61 |
| 6,974,168 B2 * | 12/2005 | Capewell ...................... | 294/185 |
| 7,137,771 B2 * | 11/2006 | Maurer et al. ................ | 414/334 |
| 7,726,932 B2 * | 6/2010 | Leblanc et al. .............. | 414/796 |
| 7,832,987 B2 | 11/2010 | Haarh et al. .............. | 416/146 R |
| 8,567,833 B2 | 10/2013 | Maj et al. .................. | 294/67.32 |
| 2010/0158654 A1 | 6/2010 | Willim ...................... | B66C 1/44 |
| 2011/0067353 A1 | 3/2011 | Tadayon ................... | E04C 3/30 |
| 2011/0067795 A1 | 3/2011 | Hancock ......................... | 156/60 |
| 2011/0116905 A1 | 5/2011 | Von Kessel et al. ..... | B64B 1/50 |
| 2011/0185571 A1 | 8/2011 | Maj et al. ........................ | 29/889 |
| 2012/0098283 A1 | 4/2012 | Maj et al. .................... | 294/67.1 |
| 2013/0236324 A1* | 9/2013 | Bech et al. ................... | 416/233 |
| 2015/0028610 A1* | 1/2015 | Hansen et al. ............. | 294/81.55 |

FOREIGN PATENT DOCUMENTS

| | | | | |
|---|---|---|---|---|
| CN | 102135776 | 7/2011 | .............. | G05D 1/02 |
| CN | 102438932 | 5/2012 | .............. | B66C 1/62 |
| CN | 102438932 A | 5/2012 | .............. | B66C 1/62 |
| CN | 102650261 | 8/2012 | .............. | B66C 1/16 |
| CN | 102650261 A | 8/2012 | .............. | F03D 1/06 |
| DE | 3606363 | 9/1987 | .............. | B66C 13/46 |
| DE | 10 2009 005 632 | 7/2010 | .............. | B66C 1/12 |
| DE | 102009005632 A1 | 7/2010 | .............. | B66C 1/12 |
| JP | S60249578 | 12/1985 | .............. | B25J 13/08 |
| JP | H058502 | 2/1993 | .............. | G02B 5/22 |
| JP | H05157625 | 6/1993 | .............. | G01J 1/02 |
| JP | 2005111110 | 4/2005 | .............. | A61B 1/00 |
| JP | 2011144808 | 7/2011 | .............. | F03D 11/00 |
| WO | WO 2005/071261 | * 8/2005 | | |
| WO | WO2011/050999 A1 | 5/2011 | .............. | F03D 1/00 |
| WO | WO2011050999 | 5/2011 | .............. | F03D 1/00 |
| WO | WO2012095112 | 7/2012 | .............. | F03D 1/00 |

OTHER PUBLICATIONS

International Preliminary Report on Patentability issued in application No. PCT/EP2013/069198, dated Mar. 17, 2015 (7 pgs).
Chinese Search report for corresponding Chinese Patent Appln. No. 201380048337.3, received Oct. 29, 2015, with English translation (4 pgs).
Notification of First Office Action issued in corresponding Chinese Patent Appln. Serial No. 201380048337.3 dated Oct. 23, 2016, with English translation (8 pgs).
Japanese Office Action (w/translation) issued in application No. 2015-531595, dated May 31, 2016 (12 pgs).
Korean Office Action (w/translation) issued in application No. 10-2015-7009966, dated Aug. 29, 2016 (11 pgs).
Chinese Office Action (w/translation) issued in application No. 201380048337.3, dated Sep. 9, 2016 (16 pgs).

* cited by examiner

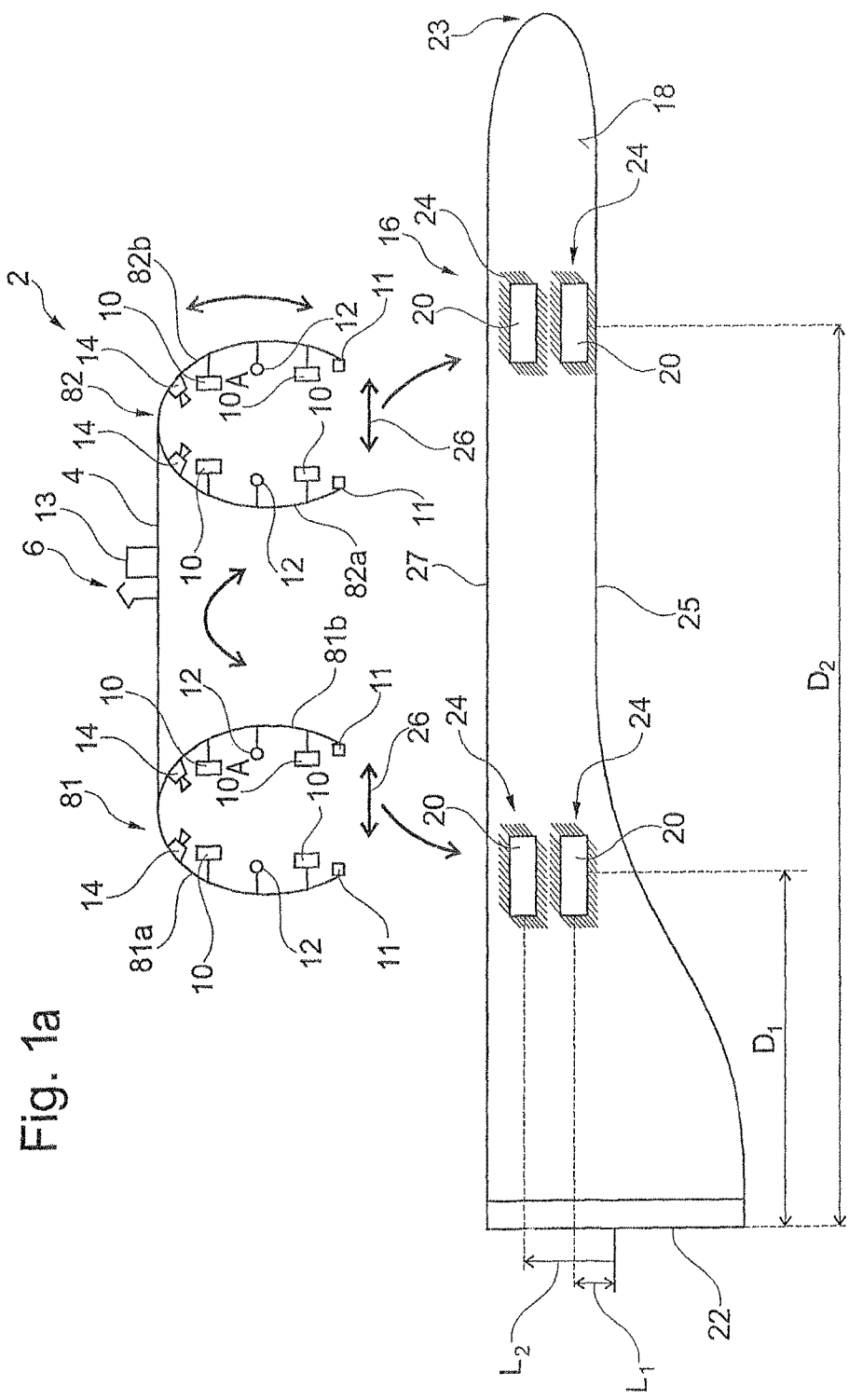

LIFTER AND METHOD FOR HANDLING A ROTOR BLADE, ROTOR BLADE FOR A WIND GENERATOR AND METHOD FOR MARKING A ROTOR BLADE, SYSTEM COMPRISING A LIFTER AND A ROTOR BLADE

FIELD OF THE INVENTION

The invention relates to a lifter for handling of a rotor blade of a wind turbine and to a method of handling a rotor blade of a wind turbine. Furthermore, the invention relates to a rotor blade for a wind generator and to a system comprising a lifter and a rotor blade.

BACKGROUND

A rotor blade of a wind turbine, also referred to as a wind power plant or a wind energy converter, is a hollow structure having structural reinforcement members which are arranged inside the rotor blade. An outer surface of the rotor blade, which is mainly represented by a pressure side and a suction side, is not entirely supported by the structural reinforcement inside the rotor blade. Handling of a rotor blade has to be performed carefully to prevent the risk for damage of the rotor blade under its own weight. The rotor blade has to be grabbed at certain points or in certain area of the surface which are supported by the structural reinforcement members inside the rotor blade. In particular during installation of a rotor blade on a rotor hub of a wind generator, the rotor blade must be grabbed in these predetermined grabbing areas which are designed to support the weight of the rotor blade.

Two textile bands which are attached to a crane hook may be applied and represent the simplest tool for handling of the rotor blade. More complex handling devices allow a more flexible and convenient handling and positioning of the rotor blade. Such a device for handling of a rotor blade of a wind turbine is for example known from WO 2012/095112 A1. This rotor blade lifter comprises two grabbing jaws each having an antagonistic pair of arms carrying a plurality of pads for supporting the rotor blade. The pads contact a surface of the rotor blade in the predetermined grabbing areas.

Positioning of the handling device has to be performed precisely in order for the pads to grab the rotor blade exactly in the predetermined grabbing areas only. Today, the alignment of the lifter with respect to the rotor blade is performed by help of geometric measurements and/or by permanently visible positioning marks. A distance from the fixing flange of the rotor blade and a distance from the geometrical center of the rotor blade to a respective one of the grabbing areas is known from the manufacture of the rotor blades. The handling tool is adjusted with respect to the fixing flange and the geometrical center, for example by help of optical distance measurements of the permanently visible marks. This is however a rather complex procedure representing a time consuming step during handling of the rotor blade. Furthermore, a marking system comprising permanently visible marks, depending on the size of the marks, is not always in accordance with the blade marking standards, mainly related to air flight regulations.

The situation becomes even more complicated if a rotor blade should be removed from a wind generator. In particular for offshore wind generators, positioning of the handling tool may be hardly possible due to wind and motion of the sea even under ordinary weather conditions.

SUMMARY

It is an object of the invention to provide a lifter for handling of a rotor blade of a wind turbine and a method for handling of a rotor blade of a wind turbine and furthermore, to provide a rotor blade for a wind generator, method of marking a rotor blade of a wind generator and a system comprising a lifter and a rotor blade which are improved with respect to the deficiencies in the prior art.

In one aspect of the invention, a lifter for handling a rotor blade of a wind turbine is provided. The lifter comprises at least one grabbing device, for example a grabbing jaw, for contacting an outer surface of the rotor blade in a predetermined grabbing area. The grabbing jaw may have arms, for example a pair of arms. The grabbing jaw may carry at least one pad for contacting an outer surface of the rotor blade in a predetermined grabbing area. In particular, the grabbing jaw may have an antagonistic pair of arms. The rotor blade comprises at least one invisible mark which indicates a position of the at least one grabbing area.

Within the context of this specification, a mark is referred to as being invisible, if the mark is invisible to the naked human eye under rather normal conditions as for example daylight and from a distance of more than one or several meters. In particular, the mark is invisible to the naked human eye under daylight illumination with respect to its color. The term "invisible" indicates that the mark may blend into the outer surface of the rotor blade. The mark may have a rather similar color in the visible range as the rotor blade. In particular, this is considered in daylight illumination. The mark may also be transparent in the visible range. The term invisible can also imply that the mark is (substantially) invisible when regarded from a certain distance. The invisible mark may be detectable—even when inspected with the naked eye—from a very close distance (less than a meter or less than 10 centimeters). The mark might be detectable from a very close distance due to a specific characteristic of the surface of the mark). However, in the context of this specification, the term "invisible" rather relates to a distance between the human eye and the mark of more than for example one, five, ten or tens of meters.

Furthermore, the lifter can comprise a detector for detecting the invisible mark, in particular a position and/or characteristic of the mark. This means that the detector is configured to evaluate or use a characteristic of the mark in a manner that it becomes detectable. The detector is configured for visual inspection of the blade in order to detect the mark. For example, this detector may be a camera, in particular a digital camera or a video camera which may be suitable for a detection of visible light. The detector may be provided with an optical filter for visualizing the invisible mark. The filter may be arranged in front of the camera.

The lifter may further comprise at least one light source which is configured for emission of light for visualizing the invisible mark. In particular, the light source may be configured for emission of light having a wavelength outside the visible spectrum. For example, the light source may be a UV lamp. However, it may be suitable to provide the lifter with a light source which is suitable for emission of light having a wavelength in the IR-region or in any other region of the electromagnetic spectrum outside the visual range. Commonly, the visual range of the electromagnetic spectrum ranges from 380 nm to 780 nm. The at least one light source is further configured for illumination of an area of the surface of the rotor blade which comprises at least one of the grabbing areas. The detector is configured for capturing image data in said illuminated area which includes the grabbing area.

The lifter according to aspects of the invention is in particular suitable for handling of a rotor blade for a wind generator according to aspects of the invention. Such a rotor blade has a surface comprising at least one grabbing area. Furthermore, there is an invisible mark on the surface of the rotor blade, wherein the mark is indicative of a position of the grabbing area. The mark may comprise fluorescent and/or luminescent material, for example the mark is a fluorescent and/or luminescent paint and/or an adhesive label which comprises a fluorescent and/or luminescent color. The mark may even be generated by painting or spraying the paint or ink on the surface of the rotor blade. However, even a suitable pen or permanent marker may be applied. The grabbing area may be marked by this fluorescent and/or luminescent material. For example, the mark surrounds the grabbing area or is located in the vicinity of the grabbing area.

The lifter according to aspects of the invention, to be more precise, the light source of the lifter, exposes the mark to light having a wavelength which may be outside the visual spectrum. However, the emission spectrum of the light source may overlap the visible spectrum or may be even arranged completely inside the visible spectrum as long as the emission of the light source is suitable for activation of a stimulated emission of the mark. In other words, the color or the pigments of in the mark may be activated or stimulated by the emission of the light source. The mark will emit a detectable optical signal which may be either in the visible range or in the invisible optical range. However, the lifter does not necessarily comprise a light source. The detector for visual inspection may be provided with an optical filter which may be suitable for conversion of light. For example, an optical emission of the mark outside the visual spectrum may be converted into light having a wavelength inside the visual spectrum. Behind the optical filter, the emitted light is detectable by the detector. In this particular case, the emission of the mark is stimulated by daylight. However, the mark is invisible in that its emission is not visible to the naked eye. For example, the mark may emit light in the UV- or in the IR-range of the electromagnetic spectrum. The filter is may be suitably selected in that, it converts the emission of the mark into visible light. According to this aspect of the invention, the light source is dispensable, however, the mark remains invisible under daylight.

The mark may comprise fluorescent and/or luminescent material which absorbs light having a wavelength outside the visual spectrum and shows a fluoresce and/or a luminescence effect. In particular, the fluorescent and/or luminescent material converts the light having a wavelength outside the visual spectrum and emits light in the visual spectrum. The detector detects this visible light and a pad of the lifter may be aligned with respect to the grabbing area of the rotor blade. According to an embodiment of the invention, the fluorescent and/or luminescent material of the marks is a UV-active or IR-active material, for example a UV-paint or an IR-paint, and the detector is for detection of visual light which is due to the fluorescence and/or luminescence of the mark.

By a detection of the marks which are indicative of the position of the grabbing areas, a subsequent alignment of the pads with respect to said grabbing areas may be performed. For example, the pads may be aligned by inspection of a live picture of a video transmission showing both, the pad and the fluorescent and/or luminescent mark of the grabbing area.

Advantageously, this may be performed using a remote control. For example, an operator can control and adjust the lifter from a control desk on the ground while the lifter operates at a reasonable height of several meters. Within a short time and without a need for any further measurement or measurement tools for aligning the lifter with respect to the rotor blade, the rotor blade may be grabbed by the lifter very precisely. In particular, rotor blades which are installed on the rotor hub of a wind turbine may be grabbed by the lifter according to aspects of the invention without an need for the workers to be lifted up to the rotor blade. Operation and control of the lifter may be performed from a secure point outside the hazard area.

Furthermore, the fluorescent and/or luminescent material may have a color which is similar or equal to a color of the remaining surface of the rotor blade when the color is considered under illumination in daylight and with the naked eye. The fluorescent and/or luminescent material, for example the paint or the adhesive label may be pigmented using fluorescent and/or luminescent pigments and pigments which provide a color according to a desired color of the rotor blade. As a result, the marks are invisible under normal circumstances which means in daylight and during normal operation of the wind generator.

According to an advantageous embodiment of the invention, the lifter comprises one detector for visual inspection per pad. In other words, there is one detector for each pad of the lifter. Each detector may be configured for capturing image data of a grabbing area which is assigned to the pad. Furthermore, the detector and the pad may be mounted on a same arm and said arm further carries the pad. There may be one light source per detector and the light source and the detector which are assigned to a pad are mounted on a same arm carrying said pad. Advantageously, the alignment of the pad with respect to the grabbing areas may be performed very precisely and reliable if there is a single illumination source and a single detector for visual inspection of a single pad.

According to another embodiment of the invention, the lifter comprises a proximity sensor which is configured for capturing a value which is indicative of a distance between the pad and the surface of the rotor blade. For example, the proximity sensor may be an ultrasonic proximity sensor or any other suitable proximity sensor. The value which is indicative of a distance between the surface of the rotor blade and the pad may be processed by a control unit which may be further configured to activate the light source and the sensor for visual inspection if this value exceeds (in particular is lower than) a predetermined threshold. Thus the control comes from a control unit, it can be activated during the complete process as an emergency procedure to detect a process as de-grabbing, high accelerations or unstable conditions. The lifter may be a battery powered device. A delayed activation of the light source and the detector will help saving energy. Furthermore, the control unit may be configured for de-activation of the light source and the camera after positioning of the pads and grabbing of the rotor blade. For example, the light source and the camera may be switched off after a predetermined time span, for example after and hour or half an hour, which is a typical time span during which grabbing of the rotor blade is done under normal circumstances.

Furthermore, the lift may comprise an inclination and/or an acceleration sensor for measuring an inclination and/or an acceleration of the lifter. These sensors may be operated similar to the proximity sensor, i.e. for activating and deactivating the sensor and/or the light source when the value of the inclination and/or the value of the acceleration exceed certain thresholds. This operation of the light source and the detector may be carried out with the inclination sensor and/or with the accelerometers, because the speed and inclination of the grabbing and de-grabbing is made at very specific angles and speeds which are perfectly known, and therefore identifiable.

According to another aspect of the invention, a method for handling of a rotor blade of a wind turbine is provided. An area of a surface of the rotor blade may be illuminated using light having a wavelength outside the visible spectrum. The illuminated area comprises a grabbing area of the rotor blade. A displacement between a pad of a lifter and the grabbing area may be detected by means of a detector for visual inspection. In particular, a displacement between a mark which is indicative of a position of the grabbing area may be detected. The lifter is configured for handling of a rotor blade of a wind turbine and comprises at least one grabbing jaw having a pair of arms. Each arm carries at least one pad for contacting an outer surface of the rotor blade in a predetermined grabbing area. At least one pad of the lifter is positioned with respect to the grabbing area. Positioning is performed based on information of the displacement between the pad and the grabbing area. After alignment of the lifter, the rotor blade is grabbed by establishing a contact between the pad and the grabbing area.

Same or similar advantages which have been already mentioned with respect to the lifter for handling of a rotor blade and with respect to the rotor blade of a wind turbine apply to the method of handling the rotor blade in a same or similar way and are therefore not repeated.

According to an advantageous embodiment of the invention, at least one of the grabbing areas on a surface of the rotor blade is marked using a fluorescent and/or a luminescent material. In particular, the fluorescent and/or luminescent material absorbs light having a wavelength outside the visible spectrum. For example a UV-fluorescent paint or adhesive label may be applied onto the surface of the rotor blade. However, the fluorescent and/or luminescent material is not restricted to UV-active material. For example, a material which absorbs light in the IR-spectrum may be applied. Furthermore, the emission spectrum is not limited to the visible spectrum. The fluorescent and/or luminescent material may emit light in the UV- or in the IR-range. Furthermore, the fluorescent and/or luminescent material is a long term stable material which is applied directly onto the surface of the rotor blade. In other words, the marks are configured to remain on the surface of the rotor blade for a long period of time, in particular, the mark may reside the surface of the blade for the whole lifetime of the rotor blade. Advantageously, the mark is available each time the rotor blade should be handled—even after a long time of operation.

According to an advantageous aspect of the invention, a method of marking at least one predetermined grabbing area on a surface of the rotor blade is provided. A mark may be generated on the surface of the rotor blade by applying a long term resistant invisible paint or label directly on the surface of the rotor blade. According to an advantageous embodiment of the invention, a dummy pad is positioned in a grabbing area of the rotor blade. Marking of this grabbing area may be performed by applying fluorescent and/or a luminescent material onto the surface of the rotor blade so as to generate a mark which surrounds the grabbing area. In particular, the mark may be a contour of the grabbing area and the dummy pad. For example, the mark may be generated by simply spraying a UV-paint over and around the dummy pad. No particular attention with respect to color application is necessary. Advantageously, the paint is invisible under normal operation conditions of the rotor blade and the application of the paint may be performed very quickly.

According to still another aspect of the invention, a system comprising a lifter according to aspects of the invention and a rotor blade according to aspects of the invention is provided.

Further advantages of the method and the system according to aspects of the invention are similar to the advantages which have been already mention above and are therefore not repeated.

BRIEF DESCRIPTION OF DRAWINGS

Further aspects and characteristics of the invention ensue from the following description of preferred embodiments of the invention with reference to the accompanying drawings, wherein FIG. 1a is a simplified perspective view showing a lifter according to an embodiment of the invention and FIG. 1b is a simplified side view of a rotor blade according to an embodiment of the invention.

DETAILED DESCRIPTION OF EXAMPLE EMBODIMENTS

In FIG. 1a, there is a lifter 2 for handling a rotor blade of a wind turbine. The lifter 2 comprises a yoke 4 having a hook 6 for carrying the lifter 2, for example by a crane any other suitable lifting device. Furthermore, there is a first and a second grabbing jaw 81, 82. The first grabbing jaw 81 comprises a pair of antagonistic arms, namely a first arm 81a and a second arm 81b. The second grabbing jaw 82 comprises a second pair of antagonistic arms, namely a first arm 82a and a second arm 82b. The antagonistic arms 81a, 81b and 82a, 82b are rotatably mounted on the yoke 4. They are pivotable so as to allow opening and closing of the first and second grabbing jaw 81, 82, respectively. According to the embodiment, each arm 81a, 81b, 82a, 82b carries two pads 10. The number of pads 10 may vary depending on a number of grabbing areas which are provided on a respective side of the rotor blade.

Furthermore, there is a light source 12 which is arranged between the pads 10 and which is mounted to a respective one of the antagonistic arms 81a, 81b, 82a, 82b. There is a single light source 12 for two pads 10 on each one of the antagonistic arms 81a, 81b, 82a, 82b. However, there may be additional light sources 12 and in particular, there may be an individual light source 12 for each pad 10, according to another embodiment of the invention. Furthermore, there is a detector 14 for visual inspection, for example a camera such as a digital camera or a video camera. The detector 14 is mounted on each one of the arms 81a, 81b, 82a, 82b. According to the embodiment in FIG. 1a, there is a single detector 14 for the two pads 10 on each arm 81a, 81b, 82a, 82b. However, each pad 10 may be provided with an individual detector 14 for visual inspection, according to another embodiment of the invention.

Each arm 81a, 81b, 82a, 82b of the grabbing jaws 81, 82 may be provided with a proximity sensor 11 for determination of a value for a distance between the pads 10 and the surface of the rotor blade. There may be a control unit 13 which is coupled to the proximity sensors 11 on the one hand and to the light source 12 and to the detector 14 on the other hand. The control unit 13 may be configured to activate the light source 12 and to the detector 14 if a distance between the pads 10 and the surface of the rotor blade is below a predetermined threshold. Furthermore, the control unit 13 may be configured to provided a wired or wireless data link to a control pad for operation of the lifter 2. This is to provide an operator of the lifter 2 with image data which is captured by the detectors 14 and to allow operation of the lifter 2 such as opening an closing of the grabbing jaws 81, 82. Motion of the grabbing jaws 81, 82 is illustrated by the double-arrows 26. However, this is not the only degree of freedom for movement of the lifter 2. The Lifter 2 may be configured to have for example six degrees of freedom so as to allow grabbing of rotor blades in various positions.

In FIG. 1b, there is a rotor blade 16 according to an embodiment of the invention. By way of an example only, a suction surface 18 of the rotor blade 16 is shown. There is a plurality of grabbing areas 20 on the surface of the rotor blade 16. According to the embodiment of the invention, the rotor blade 16 comprises eight grabbing areas 20, which means four grabbing areas 20 on either side. There are two grabbing areas 20 near to the supporting flange 22 of the rotor blade 16 and a second pair of grabbing areas 20 which are near to the wing tip 23. Naturally, a pressure surface (not shown) of the rotor blade 16 comprises grabbing areas which are arranged on said pressure surface and which are in particular symmetrical to the grabbing areas 20 on the suction side 18. A supporting structure of the rotor blade 16 is configured in that the rotor blade 16 may be lifted by grabbing the rotor blade in said grabbing areas 20. A position of the grabbing areas 20 depends on the design of an internal supporting structure of the rotor blade 16.

Commonly, a position of a grabbing area 20 is defined by a length along a span of the rotor blade, which is D1 for the grabbing areas 20 near the wing flange 22 and D2 for the grabbing areas 20 near the wing tip 23. Furthermore, a position of the grabbing areas 20 is defined by a distance from a geometrical center of the blade which is E1 for the grabbing areas 20 near the tailing edge 25 of the wing 16 and which is E2 for the grabbing areas 20 near the leading edge 27 of the rotor blade 16. The parameters E1, E2, D1, D2 are typically known from a data sheet of the rotor blade 16.

Determination of the position of the grabbing areas 20 has to be performed once in a lifetime of a rotor blade 16, in an ideal situation. Marks are applied directly onto the suction surface 18 of the rotor blade so as to indicate a position of the grabbing areas 20. Naturally, the same applies to the grabbing areas 20 which are arranged on the opposite pressure surface (not shown) of the rotor blade 16.

According to an embodiment of the invention, the marks are generated by help of a dummy pad 10A. This dummy pad 10A is identical in size when compared to the pads 10 of the lifter 2. A dummy pad 10A may be positioned at a respective one of the positions in the grabbing area 20 and a fluorescent paint may be applied on the surface 18 of the rotor blade 16. A mark 24, which are indicative of a position of the grabbing areas 20 may be provided. According to the embodiment in FIG. 1b, the mark 24 is a painted contour of the dummy pad. Preferably, a UV-paint is applied for generation of the markings 24.

For handling of the rotor blade 16 by help of the lifter 2, the antagonistic arms 81a, 81b, 82a, 82b are opened, as it is indicated by arrows 26. The lifter 2 is approximately positioned with respect to the grabbing areas 20, for example by a rough estimation of an operator of the lifter 2. Light sources 12 and the detectors 14 may be activated if the lifter 2 approaches the surface 18 of the rotor blade 16. In particular, this may be performed automatically, by help of the proximity sensors 11 which are mounted on the lifter 2. The fluorescent contour of the dummy pad, which is the mark 24, is visible in a video transmission. The lifter 2 and the grabbing jaws 81, 82 and in particular the pads 10 may be aligned with respect to the markings 24 and the grabbing areas 20. A contact between the pads 10 and the grabbing areas 20 of the rotor blade 16 is provided after successful alignment. This may be performed under permanent visual inspection or video control which is based on visual data that is captured by the sensors 14. The lifter 2 may be fixed to the rotor blade 16 within a short period of time even if the rotor blade 16 is mounted on a wind generator.

Although the invention has been described hereinabove with reference to specific embodiments, it is not limited to these embodiments and no doubt further alternatives will occur to the skilled person that lie within the scope of the invention as claimed.

The invention claimed is:
1. A method of handling a rotor blade of a wind turbine, the method comprising the steps of:
 a) generating an invisible mark on the surface of the rotor blade by applying a long term resistant invisible paint or label directly on the surface of the rotor blade that is invisible to the naked eye in daylight and indicative of a position and a contour of a grabbing area,
 b) detecting a displacement between a grabbing device and the grabbing area and the invisible mark which is indicative of the position and the contour of the grabbing area, wherein detection is performed using a detector for visual inspection,
 c) positioning the pad of a lifter in a grabbing area,
 d) grabbing the rotor blade by establishing a contact between the pad of the lifter and the grabbing area.
2. The method according to claim 1, wherein the step of detecting a displacement by visual inspection further comprises arranging a filter in front of the detector for visual inspection so as to allow visualizing of the invisible mark.
3. The method according to claim 2, further comprising the step of: illuminating a surface area of the rotor blade, said area comprising the grabbing area and an invisible mark which is indicative of a position and the contour of the grabbing area.
4. The method according to claim 1, further comprising the step of: illuminating a surface area of the rotor blade, said area comprising the grabbing area and the invisible mark which is indicative of the position and the contour of the grabbing area.
5. The method according to claim 1, wherein a fluorescent and/or luminescent paint or ink is directly applied on the surface of the rotor blade and/or a long term resistant fluorescent and/or luminescent adhesive label is directly applied on the surface of the rotor blade.
6. The method according to claim 5, wherein the step of applying the mark on the surface of the rotor blade comprises, positioning a dummy pad in one of the predetermined grabbing areas and applying the invisible paint or label on the surface of the rotor blade so as to generate a mark which surrounds the grabbing area and which is the contour of the dummy pad.
7. The method according to claim 1, wherein the step of applying the invisible mark on the surface of the rotor blade comprises, positioning a dummy pad in one of the predetermined grabbing areas and applying the invisible paint or label on the surface of the rotor blade so as to generate a invisible mark which surrounds the grabbing area and which is the contour of the dummy pad.

8. The method according to claim 1, wherein the grabbing device includes a grabbing jaw carrying the pad.

9. A rotor blade for a wind generator, the rotor blade having a surface comprising at least one grabbing area and at least one invisible mark which is indicative of a position and a contour of the at least one grabbing area.

10. The rotor blade according to claim 9, wherein the at least one mark comprises fluorescent and/or luminescent material.

11. A system comprising a rotor blade according to claim 9, and a lifter for handling the rotor blade, the lifter comprising at least one grabbing jaw for contacting an outer surface of the rotor blade in a predetermined grabbing area, wherein the lifter further comprises a detector for detecting the invisible mark.

12. The system comprising a lifter according to claim 11, wherein the at least one mark comprises fluorescent and/or luminescent material.

* * * * *